United States Patent
Varma et al.

(10) Patent No.: US 12,259,771 B2
(45) Date of Patent: Mar. 25, 2025

(54) HAND-HELD GAMING SYSTEM AND METHOD FOR CONFIGURING A HAND-HELD GAMING SYSTEM

(71) Applicant: Dell Products L.P., Round Rock, TX (US)

(72) Inventors: Suraj M. Varma, Portland, OR (US); Daniel L. Hamlin, Round Rock, TX (US); Manuel Novoa, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 181 days.

(21) Appl. No.: 18/164,706

(22) Filed: Feb. 6, 2023

(65) Prior Publication Data

US 2024/0264653 A1  Aug. 8, 2024

(51) Int. Cl.
*G06F 1/3212* (2019.01)
*G06F 1/16* (2006.01)
*G06F 1/20* (2006.01)
*G06F 1/3234* (2019.01)

(52) U.S. Cl.
CPC .......... *G06F 1/3212* (2013.01); *G06F 1/1632* (2013.01); *G06F 1/206* (2013.01); *G06F 1/3243* (2013.01)

(58) Field of Classification Search
CPC ...... G06F 1/3212; G06F 1/1632; G06F 1/206; G06F 1/3243; G06F 1/32
See application file for complete search history.

(56) References Cited

U.S. PATENT DOCUMENTS

2003/0115494 A1 * 6/2003 Cervantes ............. G06F 1/3203
  713/322
2015/0169034 A1 * 6/2015 Huang .................. G06F 1/3234
  713/100

* cited by examiner

*Primary Examiner* — Jaweed A Abbaszadeh
*Assistant Examiner* — Brynne J. Corcoran
(74) *Attorney, Agent, or Firm* — McDermott Will & Emery LLP (57) ABSTRACT

A system for configuring a handheld device based on a state of the handheld device includes an embedded controller (EC), a provided service, user selectable thermal tables (USTT), an Operating System (OS) scheduler, a power plan management (PPM) service and a thermal management service (TMS). The provided service communicates with the EC to determine if the handheld device is docked or coupled to a power supply, is stationary or moving, is coupled to an external display and whether a Peak Mode button is activated and communicates signals to one or more of the USTT, the OS scheduler, the PPM and the TMS to configure the handheld device in one of an Ultra Performance Mode, an Optimized Mode, a Quiet Mode or a Peak Mode.

19 Claims, 7 Drawing Sheets

FIG. 1

| | HANDHELD DEVICE STATE | POWER SOURCE | INTEGRATED DISPLAY | EXTERNAL DISPLAY | USTT | CPU FREQ (% MAX) | IGPU | DGPU | THREAD SCHEDULING | SHORT THREAD SCHEDULING |
|---|---|---|---|---|---|---|---|---|---|---|
| 202-1 | DOCKED | AC | ON | YES VIA DOCK | ULTRA PERFORMANCE | 100 | ENABLED | ENABLED | ALL | ALL |
| 202-2 | AC POWER | AC | ON | NO | OPTIMIZED | 75 | ENABLED | DISABLED | E-CORES | P-CORES |
| 202-3 | ON TABLE | DC | ON | NO | OPTIMIZED | 75 | ENABLED | DISABLED | E-CORES | P-CORES |
| 202-4 | ON TABLE WITH EXTERNAL DISPLAY | DC | ON | YES VIA ADAPTER | QUIET | 50 | ENABLED | DISABLED | E-CORES | E-CORES |
| 202-5 | IN HAND USING INTEGRATED DISPLAY | DC | ON | NO | QUIET | 50 | ENABLED | DISABLED | E-CORES | E-CORES |
| 202-6 | IN HAND WITH EXTERNAL DISPLAY | DC | MIRRORED | YES VIA ADAPTER | QUIET | 50 | ENABLED | DISABLED | E-CORES | E-CORES |
| 202-7 | PEAK MODE BUTTON ACTIVATED | DC | ON | NO | OPTIMIZED | 75 | ENABLED | DISABLED | ALL | ALL |

HAND-HELD GAMING SYSTEM AND METHOD FOR CONFIGURING A HAND-HELD GAMING SYSTEM

BACKGROUND

Field of the Disclosure

This disclosure relates generally to information handling systems and, more particularly, to systems with hand-held devices and methods for configuring a system based on a hand-held device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Handheld devices may be operated in different settings, including operating while connected to a constant power supply via a power cord, operating on battery power, communicating with a dock or display via a wired operation, communicating with the dock or display via a wireless connection (e.g., wireless operation), operating when positioned in a dock, operating as a stand alone system (e.g., tabletop operation) and operating while being held (e.g., hand-held operation).

SUMMARY

Embodiments may be generally directed to a method of configuring operation of a handheld device. The method may comprise an embedded controller (EC) determining one of: the handheld device is coupled to a dock, is coupled to a power supply supplying constant power, or is receiving battery power from a battery. The method may further comprise a provided service stored in a memory medium in the handheld device determining a state of the handheld device by communicating with the EC to determine if the handheld device is docked, if the handheld device is operating on the constant power from the power supply or if the handheld device is operating on the battery power from the battery, and determining if the handheld device is moving or is stationary. The method may further comprise the provided service configuring the handheld device in one of an Ultra Performance Mode, an Optimized Mode, a Quiet Mode or a Peak Mode in response to determining the state of the handheld device.

In some embodiments, configuring the handheld device to operate in the Ultra Performance Mode comprises: in response to receiving a signal from the EC indicating the handheld device is coupled to the dock, the provided service performs: communicating a signal to enable thread processing on an integrated graphics processing unit (IGPU) in a processor; communicating a signal to enable thread processing on a discrete graphics processing unit (DGPU); communicating a signal to an operating system (OS) scheduler to schedule a set of regular threads on the IGPU and the DGPU; and communicating a signal to the OS scheduler to schedule a set of short threads on the IGPU and the DGPU.

In some embodiments, configuring the handheld device to operate in the Optimized Mode comprises: in response to receiving a signal from the EC indicating the handheld device is receiving constant power from a constant power supply, the provided service performs: communicating a signal to enable thread processing on an integrated graphics processing unit (IGPU); communicating a signal to disable thread processing on a discrete graphics processing unit (DGPU); communicating a signal to an operating system (OS) scheduler to schedule a set of regular threads on a set of efficiency cores in the IGPU; and communicating a signal to the OS scheduler to schedule a set of short threads on a set of performance cores in the IGPU.

In some embodiments, the provided service further performs: determining one or more of the handheld device is not moving and the handheld device is coupled to an external display; and communicating a signal to a thermal management service to operate a fan based on a thermal parameter.

In some embodiments, configuring the handheld device to operate in the Quiet Mode comprises: in response to receiving a signal from the EC indicating the handheld device is receiving battery power from the battery, the provided service performs: determining the handheld device is moving; communicating a signal to enable thread processing on an integrated graphics processing unit (IGPU); communicating a signal to disable thread processing on a discrete graphics processing unit (DGPU); communicating a signal to an operating system (OS) scheduler to schedule a set of regular threads on a set of efficiency cores in the IGPU; and communicating a signal to the OS scheduler to schedule a set of short threads on the set of efficiency cores in the IGPU. In some embodiments, the provided service further performs: determining one or more of the handheld device is not moving and the handheld device is coupled to an external display; and communicating a signal to a thermal management service to operate a fan based on an acoustic parameter.

In some embodiments, configuring the handheld device to operate in the Peak Mode comprises: in response to receiving a signal from the EC indicating a Peak Mode button is activated, the provided service performs: determining a battery charge of the battery; and in response to determining the battery charge of the battery is greater than the minimum charge threshold: communicating a signal to a processor to operate at a frequency less than a maximum frequency; communicating a signal to enable thread processing on an integrated graphics processing unit (IGPU); communicating a signal to disable thread processing on a discrete graphics processing unit (DGPU); communicating a signal to an operating system (OS) scheduler to schedule a set of regular threads on a set of efficiency cores in the IGPU; and communicating a signal to the OS scheduler to schedule a set of short threads on the set of efficiency cores in the IGPU.

In some embodiments, configuring the handheld device to operate in the Peak Mode comprises: in response to determining the battery charge of the battery is less than the minimum charge threshold: communicating a signal to disable thread processing on the DGPU; and communicating a signal to the OS scheduler to schedule the set of short threads on the set of efficiency cores in the IGPU.

In some embodiments, the provided service further performs: communicating a signal to a processor such that a set of performance cores operate at one of a first performance level associated with the Ultra Performance Mode, a second performance level associated with the Optimized Mode, a third performance level associated with the Quiet Mode or a fourth performance level associated with the Peak Mode; and communicating a signal to the processor such that a set of efficiency cores operate at one of the first performance level, the second performance level, the third performance level or the fourth performance level.

In some embodiments, the first performance level is approximately 100% of a maximum performance level. In some embodiments, the second performance level is between 65-85% of the maximum performance level. In some embodiments, the third performance level is between 40-60% of the maximum performance level. In some embodiments, the fourth performance level is between 65-85% of the maximum performance level.

Embodiments may also be directed to a system for configuring a handheld device based on a state of the handheld device. In some embodiments, the system comprises a handheld device with an embedded controller (EC); a battery; a Peak Mode button; and a memory medium. The memory medium may store a provided service, user selectable thermal tables (USTT), a power plan management (PPM) software, and a thermal management service (TMS) software. The system may further comprise a dock configured to receive the handheld device and a power supply configured to supply constant power to the handheld device when coupled to the handheld device. In some embodiments, the EC is configured to communicate with a dock sensor, the power supply, a battery sensor, and the Peak Mode button and communicate a signal to the provided service. The provided service may be configured to determine, based on the signal, one of the handheld device being docked, coupled to the power supply or receiving power from the battery; determine whether the handheld device is coupled to an external display; determine whether the handheld device is stationary; determine whether the Peak Mode button is activated; and configure the handheld device in one of an Ultra Performance Mode, an Optimized Mode, a Quiet Mode or a Peak Mode based on one or more of whether the handheld device is docked, coupled to the power supply, receiving power from the battery, coupled to the external display, is stationary and whether the Peak Mode button is activated.

In some embodiments, in response to determining the handheld device is docked, the provided service is configured to: communicate a signal to enable thread processing on an integrated graphics processing unit (IGPU); communicate a signal to enable thread processing on a discrete graphics processing unit (DGPU); communicate a signal to an operating system (OS) scheduler to schedule a set of regular threads on the IGPU and the DGPU; and communicate a signal to the OS scheduler to schedule a set of short threads on the IGPU and the DGPU.

In some embodiments, in response to determining the handheld device is not docked and connected to constant power, the provided service is configured to: communicate a signal to enable thread processing on an integrated graphics processing unit (IGPU); communicate a signal to disable thread processing on a discrete graphics processing unit (DGPU); communicate a signal to an operating system (OS) scheduler to schedule a set of regular threads on a set of efficiency cores in the IGPU; and communicate a signal to the OS scheduler to schedule a set of short threads on a set of performance cores in the IGPU.

In some embodiments, the provided service is configured to: determine one or more of the handheld device is not moving and the handheld device is coupled to an external display; and communicate a signal to the TMS to operate a fan based on a thermal parameter.

In some embodiments, in response to determining the handheld device is not docked and is receiving power from the battery, the provided service is configured to: determine whether the handheld device is moving; communicate a signal to enable thread processing on an integrated graphics processing unit (IGPU); communicate a signal to disable thread processing on a discrete graphics processing unit (DGPU); communicate a signal to an operating system (OS) scheduler to schedule a set of regular threads on a set of efficiency cores in the IGPU; and communicate a signal to the OS scheduler to schedule a set of short threads on the set of efficiency cores in the IGPU.

In some embodiments, the provided service is configured to: determine one or more of the handheld device is not moving and the handheld device is coupled to an external display; and communicate a signal to a thermal management service to operate a fan based on an acoustic parameter.

In some embodiments, the provided service is configured to: determine one or more of the handheld device is not moving and the handheld device is coupled to an external display; and communicate a signal to a thermal management service to operate a fan based on a thermal parameter.

In some embodiments, in response to determining the Peak Mode button is activated, the provided service is configured to: determine a battery charge of the battery; and in response to determining the battery charge of the battery is greater than a minimum charge threshold, communicate a signal to enable thread processing on an integrated graphics processing unit (IGPU); communicate a signal to enable thread processing on a discrete graphics processing unit (DGPU); communicate a signal to an operating system (OS) scheduler to schedule a set of regular threads on a set of performance cores and a set of efficiency cores in the IGPU and a set of cores in the DGPU; and communicate a signal to the OS scheduler to schedule a set of short threads on the set of performance cores and the set of efficiency cores in the IGPU and the set of cores in the DGPU.

In some embodiments, in response to determining the Peak Mode button is activated, the provided service is configured to: determine a battery charge of the battery; and in response to determining the battery charge of the battery is less than the minimum charge threshold: communicate a signal to enable thread processing on an integrated graphics processing unit (IGPU); communicate a signal to disable thread processing on a discrete graphics processing unit (DGPU); communicate a signal to an operating system (OS) scheduler to schedule a set of regular threads on a set of efficiency cores in the IGPU; and communicate a signal to the OS scheduler to schedule a set of short threads on the set of efficiency cores in the IGPU.

In some embodiments, the provided service is configured to: communicate a signal to the processor such that a set of performance cores operate at one of a first performance level associated with the Ultra Performance Mode, a second performance level associated with the Optimized Mode, a third performance level associated with the Quiet Mode or a fourth performance level associated with the Peak Mode; and communicate a signal to the processor such that a set of efficiency cores operate at one of the first performance level, the second performance level, the third performance level or the fourth performance level.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Embodiments disclosed herein are described with respect to networking operations but may also be practiced with other operations. Particular embodiments are best understood by reference to FIGS. 1-7, wherein like numbers are used to indicate like and corresponding parts.

Overview

Figure 1:
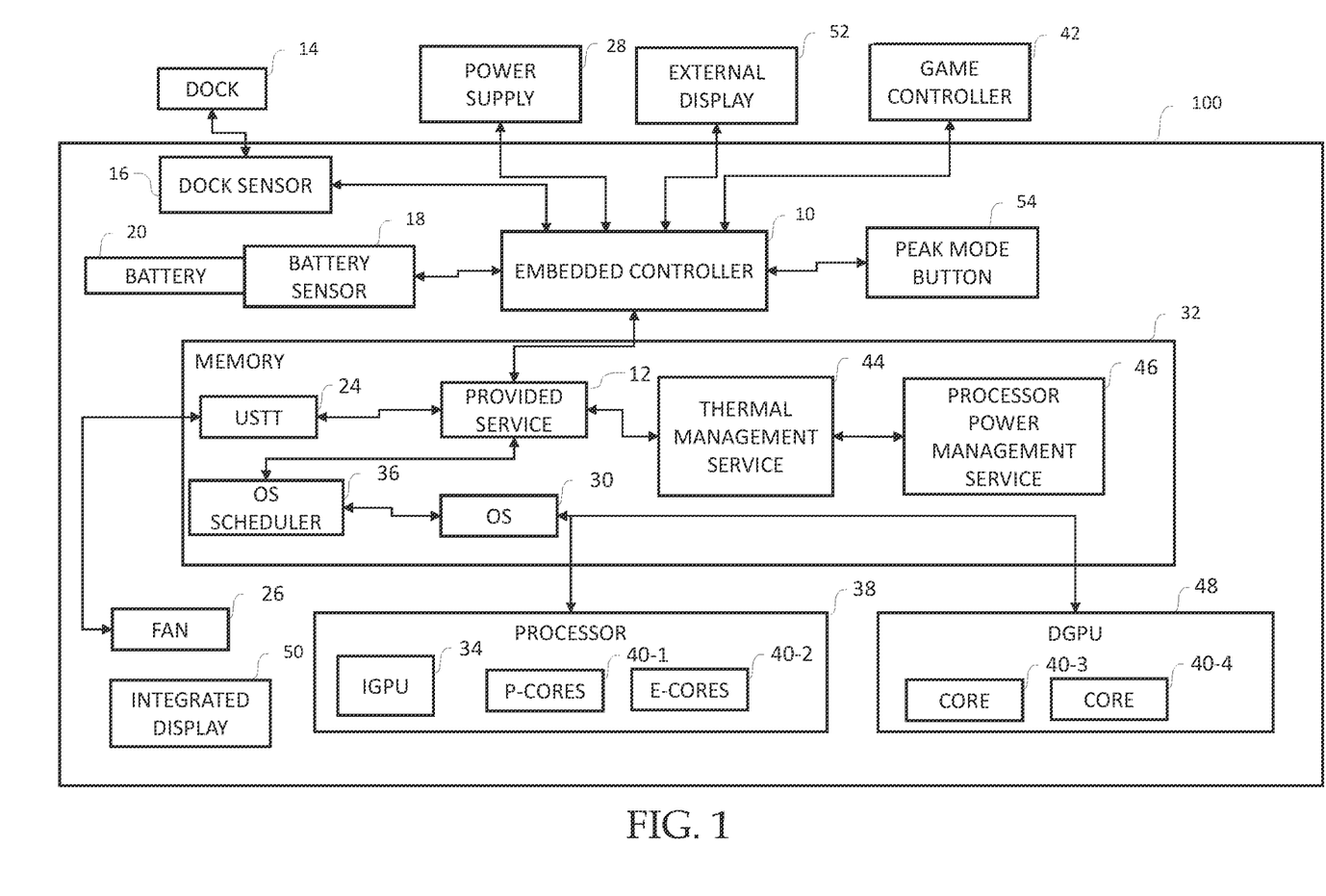
FIG. 1 is a system level architecture diagram illustrating a system for configuring operation of a handheld device.

FIG. 1 depicts a system architecture diagram illustrating components of a system for configuring operation of a handheld device 100 based on a detected state of handheld device 100.

Handheld device 100 may be coupled to power supply 22 to receive constant power (e.g., AC power) and may include battery 20 for supplying power (e.g., DC power) when not connected to power supply 22. Handheld device 100 may also be coupled to dock 14 (e.g., by positioning handheld device 100 in dock 14). Handheld device 100 may be connected to dock 14, external display 52 or one or more game controllers 42 via wired or wireless connections.

Embodiments may determine a configuration of handheld device 100 based on a state of handheld device 100. The state of handheld device 100 may be determined based on determining one or more of a connection (e.g., physical coupling or wireless connection) to dock 14, connection to a source of constant power (e.g., AC power supplied by power supply 28) or battery power (e.g., DC power supplied by battery 20), a connection (e.g., a cable or a wireless connection) to external display 52 and/or a connection (e.g., a cable or via a wireless connection) to one or more game controllers 42.

Handheld device 100 may comprise embedded controller (EC) 10, dock sensor 16 for determining whether handheld device 10 is positioned in dock 14, battery capacity sensor 18 for determining a charge capacity of battery 20, a set of fans 26, a processor 38 comprising a plurality of cores 40 including performance (P) cores 40-1 and efficient (E) cores 40-2 and an integrated graphics processing unit (IGPU) 34, a discrete graphics processing unit (DGPU) 48 (which may also include a first set of cores 40-3 and a second set of cores 40-4) and integrated display 50.

Handheld device 100 may also comprise memory medium 32 storing provided service software 12 (which may also be referred to as provided service 12), user selectable thermal tables (USTT) 24, an operating system (OS) 30, OS scheduler software 36, thermal management service (TMS) 44 and power plan management (PPM) software 46. In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

Power plan management software 46 may control a speed of fan 26 and processor 38 to control system performance, thermal parameters (e.g., skin temperature, component temperatures) and acoustic parameters (e.g., fan noise). TMS software 44 may contain parameters for operating handheld device 100 based on thermal settings and include an emergency power off (EPO) setting. Handheld device 100 may further include firmware modules (FMs) and Applications/Services designed to detect a state, orientation or use of handheld device 100 and may use this information to switch operation of handheld device 100 between an Ultra Performance Mode, an Optimized Mode, a Quiet Mode and a Peak Mode based on the state of handheld device 100, including dynamically managing thread scheduling and a performance level of cores 40 in IGPU 34 and DGPU 48.

Figure 2:
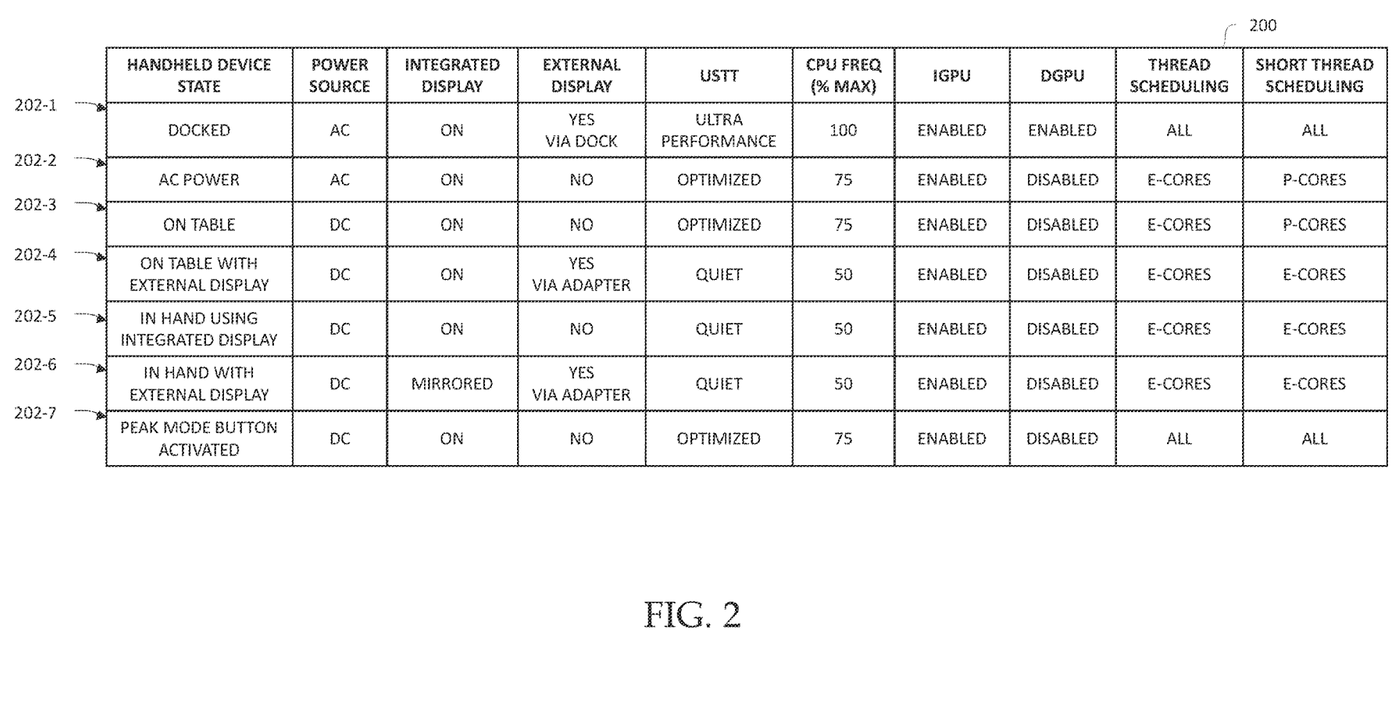
FIG. 2 is a chart depicting settings and operating parameters for a handheld device based on a status of the handheld device.

FIG. 2 depicts chart 200 of various states of handheld device 100.

Docked Mode

Referring to row 202-1, a user may connect handheld device 100 onto dock 14 which may be connected to constant power (e.g., AC power) that may be connected to external display 52 (e.g., a large screen display). The user may use an external game controller 42 to interact with handheld device 100 to play a game. For the full screen and full power experience, handheld device 100 may be configured for operation in Ultra Performance Mode for the best performance but with increased acoustic parameters (e.g., more noise) and increased thermal parameters (e.g., increased skin temperature, increased component temperature). Provided service software 12 may enable processing on cores 40-3 and 40-4 in DGPU 48 and IGPU 34, wherein P-cores 40-1 and E-cores 40-2 may run at speeds up to a first performance level (e.g., 100%) of a maximum performance level. Operating System (OS) scheduler 36 may schedule regular and short threads on both P-cores 40-1 and E-cores 40-2 in IGPU 34 and cores 40-3 and 40-4 in DGPU 48. Thermal management service 44 may operate fan 26 and PPM 46 may configure processor 38 based on best performance of handheld device 100.

Undocked Modes

AC POWER mode—Referring to row 202-2, a user may take handheld device 100 to a friend's place, but handheld device 100 may be low on battery power. The user may connect handheld device to power supply 22 (e.g., using a Type-C power adapter) to power handheld device 100 while gaming. Since handheld device 100 as operating in a handheld mode and connected to AC power, handheld device 100 switches operation to Optimized Mode configured for good performance and with good thermal parameters. Handheld device 100 now uses IGPU 34 for processing information but processing on cores 40-3 and 40-4 in DGPU 48 may be disabled. OS scheduling is preferred on E-cores 40-2 and P-cores 40-1 may run short running threads. Thermal management service 44 may operate fan 26 and PPM 46 may configure processor 38 based on thermal parameters. For example, processor 38 may be configured to run at a second performance level (e.g., 65-85%) of the maximum performance level, thereby limiting power usage.

ON TABLE mode—Referring to row 202-3, a user and a friend may decide to use detachable game controllers 42 to play on a handheld device 100 which may be kept on a table (e.g., two-person play). Since handheld device 100 is not hand-held anymore and operating on battery power, handheld device 100 may switch to an Optimized Mode for good performance but with increased acoustics. OS scheduler 36 continues to schedule threads on IGPU 34 but processing on cores 40-3 and 40-4 in DGPU 48 may be disabled. Thread scheduling by OS scheduler 36 is preferred on E-cores 40-2 and P-cores 40-1 may run short running threads. Thermal management service 44 may operate fan 26 and PPM 46 may configure processor 38 based on thermal parameters. For example, processor 38 may be configured to run at a second performance level (e.g., 65-85%) of the maximum performance level, thereby limiting power usage.

ON TABLE WITH EXTERNAL DISPLAY mode—Referring to row 202-4, a user's handheld device 100 may be fully charged, so the user plugs handheld device 100 on to a friend's external display 52 (e.g., connects using a Type-C to HDMI dongle). Since handheld device 100 is still operating in handheld mode but is operating on DC power (e.g., battery 20) and stationary, handheld device 100 switches operation to Quiet Mode for lower power consumption. Handheld device 100 may display information on external display 52 via an adapter (e.g., a HDMI dongle). OS scheduler may schedule both regular threads and short threads on E-cores 40-2 in IGPU 34 and processing on cores 40-3 and 40-4 in DGPU 48 may be disabled. Thermal management service 44 may operate fan 26 and PPM 46 may configure processor 38 based on thermal parameters. For example, processor 38 may be configured to run at a third performance level (e.g., 40-60%) of the maximum performance level, greatly reducing power usage.

IN HAND mode—Referring to row 202-5, a user may disconnect handheld device 100 from dock 14 and sit on a sofa for further game play. Since handheld device 100 is handheld (e.g., moving), handheld device 100 may switch to operating in Quiet Mode for the best acoustics parameters (e.g., quietest fan operation) and lowest power consumption for lower thermals (e.g., lower skin temperature). Handheld device 100 may use integrated display 50 for displaying the game. Processing on cores 40-3 and 40-4 in DGPU 48 may be disabled and OS scheduler 36 may run threads on E-cores 40-2 only in IGPU 34. Thermal management service 44 may operate fan 26 and PPM 46 may configure processor 38 based on thermal and/or acoustic parameters. For example, processor 38 may be configured to run at the third performance level (e.g., 40-60%) of the maximum performance level, reducing acoustic parameters (e.g., noise) and reducing power usage for lower thermal parameters (e.g., lower skin temperature).

IN HAND WITH EXTERNAL DISPLAY mode—Referring to row 202-6, a user may plug handheld device 100 on to a friend's external display 52 (e.g., connect using a Type-C to HDMI dongle). Since handheld device 100 is still operating in handheld mode but is operating on DC power (e.g., power from battery 20), handheld device 100 may switch operation to Quiet Mode for the best acoustics experience and lowest thermals. Handheld device 100 switches operations to display information on external display 52 via an adapter (e.g., a HDMI dongle). Processing on cores 40-3 and 40-4 in DGPU 48 may be disabled and OS scheduler 36 may schedule regular and short threads to E-cores 40-2 only on IGPU 34. Thermal management service 44 may operate fan 26 and PPM 46 may configure processor 38 based on thermal and/or acoustic parameters. For example, processor 38 may be configured to run at the third performance level (e.g., 40-60%) of the maximum performance level, reducing acoustic parameters (e.g., noise) and reducing power usage for lower thermal parameters (e.g., lower skin temperature).

PEAK Mode—Referring to row 202-7, a user with handheld device 100 operating in DC handheld mode may be willing to give up battery charge for peak performance for a limited time (e.g., while commuting from a home to an office). The user may activate Peak Mode button 54 to switch handheld device 100 to operate to peak performance mode.

If the battery charge is greater than a minimum charge threshold (e.g., 20% total charge capacity), handheld device 100 may switch operation to an Optimized Mode. OS scheduler 36 may schedule regular and short threads on both P-cores 40-1 and E-cores 40-2. Thermal management service 44 may operate fan 26 and PPM 46 may configure processing on cores 40-3 and/or 40-4 in processor 38 based on best performance levels. For example, processor 38 may be configured to run at a fourth performance level (e.g., 65-85% of the maximum performance level) because the user is willing to accept a shorter playing time for better performance. In some embodiments, cores 40-3 and 40-4 in DGPU 48 may comprise Floating Point Units (FPUs) that may be gated on or off for power-management.

If the battery charge drops to or below the minimum charge threshold, handheld device 100 may switch to operating in Quiet Mode with OS scheduling limited to E-cores 40-2 only. Thermal management service 44 may operate fan 26 and PPM 46 may configure processor 38 based on thermal and/or acoustic parameters. For example, processor 38 may be configured to run at the third performance level (e.g., 40-60%) of the maximum performance level, reducing acoustic parameters (e.g., noise) and reducing power usage for lower thermal parameters (e.g., lower skin temperature).

Detecting a State of the Handheld Device

Components of handheld device 100 may include embedded controller (EC) 10 configured to detect certain conditions associated with handheld device 100 and communicate a signal to provided service software 12.

In some embodiments, EC 10 is configured for communicating with dock sensor 16, battery charge sensor 18, power supply 22 and Peak Mode button 54 and generating a signal based on a corresponding condition. Table 1 contains a list of signals and conditions that EC 10 may detect.

TABLE 1

| SIGNAL | DETECTED CONDITION |
| --- | --- |
| DOC_Y | Handheld device 100 is docked |
| DOC_N | Handheld device 100 is undocked |
| DOC_N_DC | Handheld device 100 is undocked and operating on DC (battery) power supplied by battery 20 |
| DOC_N_AC | Handheld device 100 is undocked and operating on constant AC power supplied by power supply 22 |
| PEAK_MODE_Y | Peak Mode button 54 is activated |
| PEAK_MODE_N | Peak Mode button 54 is not activated |
| BATT_CAP_Y | Battery charge is greater than a minimum charge threshold |
| BATT_CAP_N | Battery charge is not greater than a minimum charge threshold |

For example, EC 10 may communicate with dock sensor 16 and determine handheld device 100 is docked. In response to determining handheld device 100 is docked, EC 10 may send a docking signal (e.g., DOC_Y) to provided service software 12.

In some embodiments, provided service software 12 may include instructions for determining a set of signals based on a corresponding condition. Table 2 contains a list of signals and conditions that provided service software 12 may determine.

TABLE 2

| SIGNAL | DETECTED CONDITION |
| --- | --- |
| HHLD_N | Handheld device 100 is stationary (e.g., sitting on a table) |
| HHLD_Y | Handheld device 100 is not stationary (e.g., in a user's hands) |
| EXT_Y | Handheld device 100 is connected to an external display 52 |
| EXT_N | Handheld device 100 is not connected to an external display 52 |

In some embodiments, provided service software 12 may communicate the following signals in response to a policy decision:

TABLE 3

| SIGNAL | RESULT |
| --- | --- |
| UST-U | Enabling USTT Ultra Performance Mode |
| UST_O | Enabling USTT Optimized Mode |
| UST_Q | Enabling USTT Quiet Mode |
| FRQ_P_H | Setting Performance Core Max Performance |
| FRQ_E_H | Setting Efficiency Core Max Performance |
| FRQ_P_L_X | Setting Performance Core Reduced Performance (X may be specified (e.g., 50% for Quiet Mode or 75% for Optimized Mode)) |
| FRQ_E_L_X | Setting Efficiency Core Reduced Performance (X may be specified (e.g., 50% for Quiet Mode or 75% for Optimized Mode)) |
| SCHP_A | Setting the Scheduling Policy to run threads on all cores 40 |
| SCHP_E | Setting the Scheduling Policy to run threads on E-cores 40-2 only |
| SSCHP_P | Setting the Scheduling Policy to prefer P-cores 40-1 |
| SSCHP_A | Setting the Short Thread Scheduling Policy to run threads on all cores 40 |
| SSCHP_E | Setting the Short Scheduling Policy to run threads on E-cores 40-2 only |

In response to determining handheld device 100 is not docked, EC 10 may determine whether handheld device 100 is connected to power supply 22. EC 10 may send a second dock signal (e.g., DOC_N_AC or DOC_N_DC) to provided service software 12. The second dock signal may depend on whether handheld device 100 is connected to power supply 22 supplying a constant power supply (e.g., AC power) via a cable connection or operating on battery power (e.g., DC power) supplied by battery 20. EC 10 may also communicate with battery charge sensor 18 and send a signal (e.g., BATT_CAP) to provided service software 12 reporting the current remaining battery charge. EC 10 may communicate with Peak Mode button 54 and send a first Peak Mode button signal (e.g., PEAK_MODE_Y) to provided service software 12 if Peak Mode button 54 is activated or send a second Peak Mode button signal (e.g., PEAK_MODE_N) to provided service software 12 if Peak Mode button 54 is not activated or if handheld device 100 should exit Peak Mode.

Provided service software 12, in response to a signal received from EC 10 and/or determining a condition, may communicate a set of signals to USTT software 24 to switch operation mode between Ultra Performance, Optimized, Quiet or Peak Modes based on a state of handheld device 100. USTT software 24 may communicate a set of signals associated with a thermal management policy to thermal management service (TMS) software 44 to execute instructions to select new settings for Power plan management (PPM) software 46. A power management policy may indicate which cores 40 may run threads and specify a target performance. USTT software 24 may send appropriate PPM change requests to the OS 30 for improved Performance/Power arbitration (e.g., turn off EPO in any existing thermal management software when OS PPM is managed via provided service software 12.)

In some embodiments, provided service software 12 detects if handheld device 100 is operating in Handheld mode (e.g., is moving) or in Table mode (e.g., is stationary). For example, provided service software 24 may communicate with accelerometers or other motion sensors (not shown) in handheld device 100 to determine whether handheld device 100 is moving or stationary. If handheld device 100 is determined to be handheld (e.g., moving), provided service software 12 may determine a first signal (e.g., HHLD_Y) to USTT 24, otherwise provided service software 12 may determine a second signal (e.g., HHLD_N) to USTT 24 indicating handheld device 10 is stationary.

In some embodiments, provided service software 12 detects if handheld device 100 is connected to an external display 52. For example, provided service software 24 may determine if an HDMI cable (not shown) is connected to handheld device 100 to determine whether handheld device 100 is connected to external display 52. If handheld device 100 is connected to external display 52, the provided service software 12 may send a first signal (e.g., EXT_Y) to USTT 24. If handheld device 100 is not connected to display 52, provided service software 12 may send a second signal (e.g., EXT_N) to USTT 24. In some embodiments, if handheld device 100 is connected to external display 52, integrated display 50 may be turned off.

Method for Configuring Operation

FIGS. 3-7 depict flow diagrams of embodiments for configuring operation of handheld device 100. Handheld device 100 may be configured based on determining handheld device 100 is in one of at least the following states: Docked; AC Connected, wherein handheld device 100 is coupled to a constant source (e.g., AC) power; Table; Table with External Display; Handheld; Handheld with External Display; and Peak, discussed with greater details below.

Figure 3:
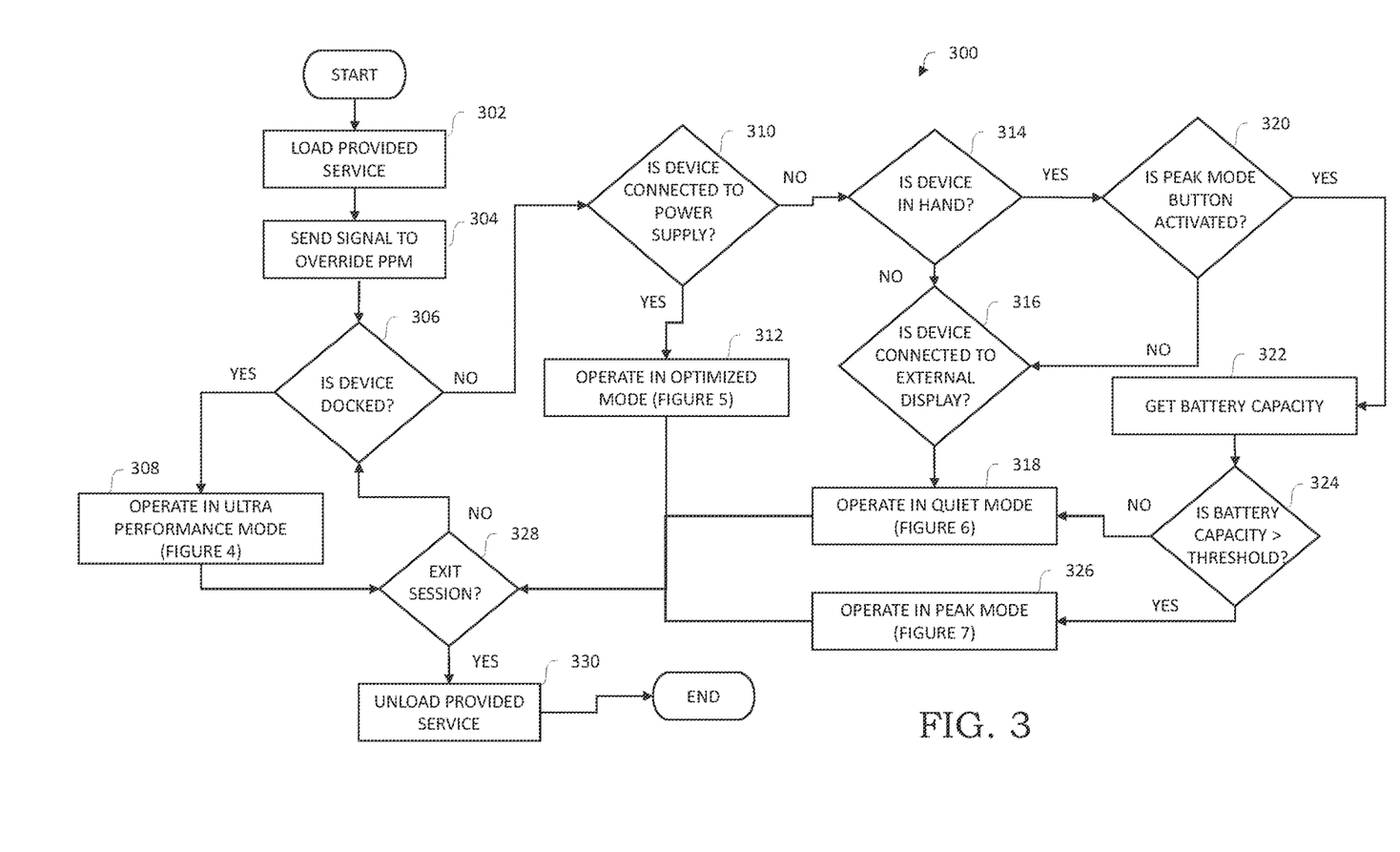
FIGS. 3-7 are flow diagrams illustrating a method for configuring operation of a handheld device.

At step 302, when handheld device 100 is powered on, handheld device 100 loads provided software service 12.

At step 304, handheld device 100 may communicate a signal to disable operating system (OS) power plan management (PPM) from thermal management service 44.

At step 306, handheld device 100 may determine whether handheld device 100 is coupled ("docked") to dock 14. In some embodiments, EC 10 comprises dock sensor 16 and software to determine when handheld device 100 is coupled to dock 14.

Figure 4:
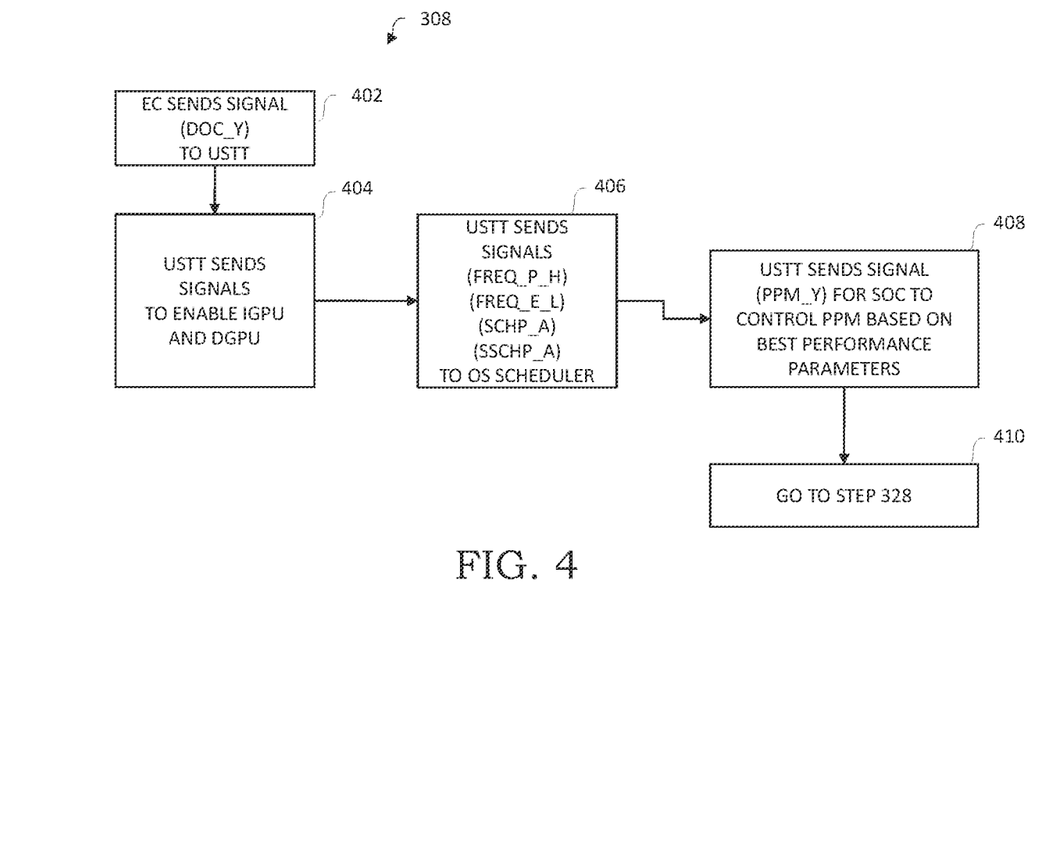

At step 308, in response to EC 10 determining handheld device 100 is docked and dock 14 is supplying power to handheld device 100, embodiments may be configured to operate in Ultra Performance Mode, discussed in greater detail with respect to FIG. 4.

At step 310, embodiments may determine if handheld device 100 is connected to power supply 22.

Figure 5:
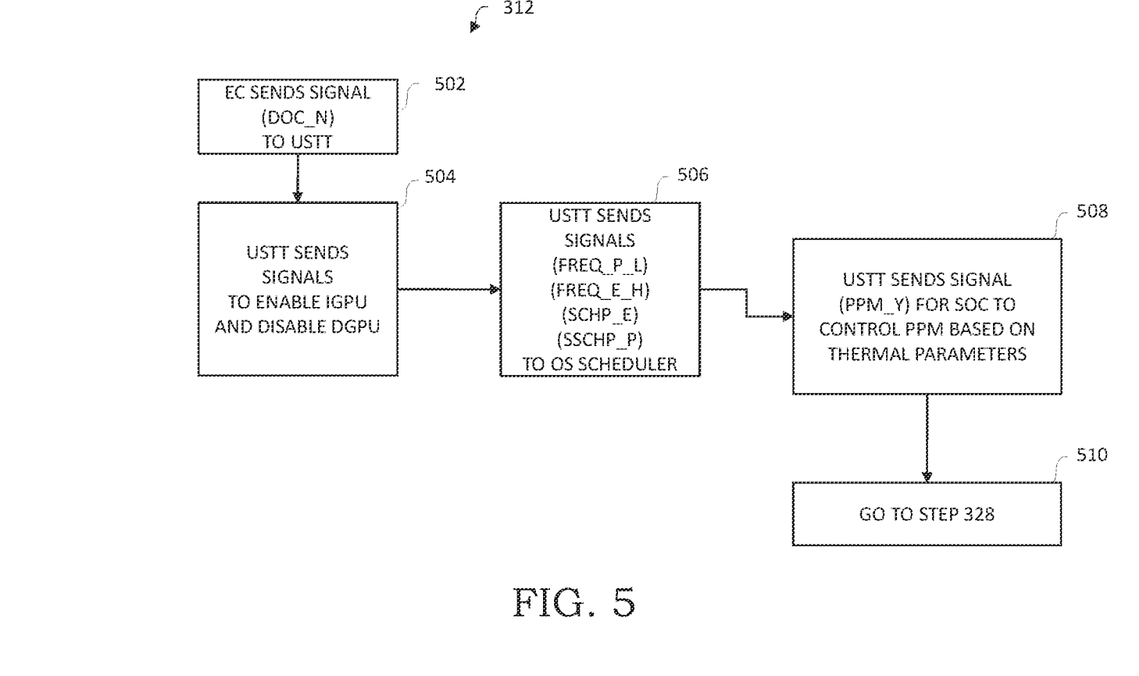

At step 312, in response to EC 10 determining handheld device 100 is not docked but connected to power supply 22, embodiments may be configured to operate in Optimized Mode, discussed in greater detail with respect to FIG. 5.

At step 314, embodiments may determine if handheld device 100 is being held by a user.

At step 316, in response to EC 10 determining handheld device 100 is not connected to power supply 22 and a user is not holding handheld device 100, embodiments may determine if handheld device 100 is coupled to an external display 52.

Figure 6:
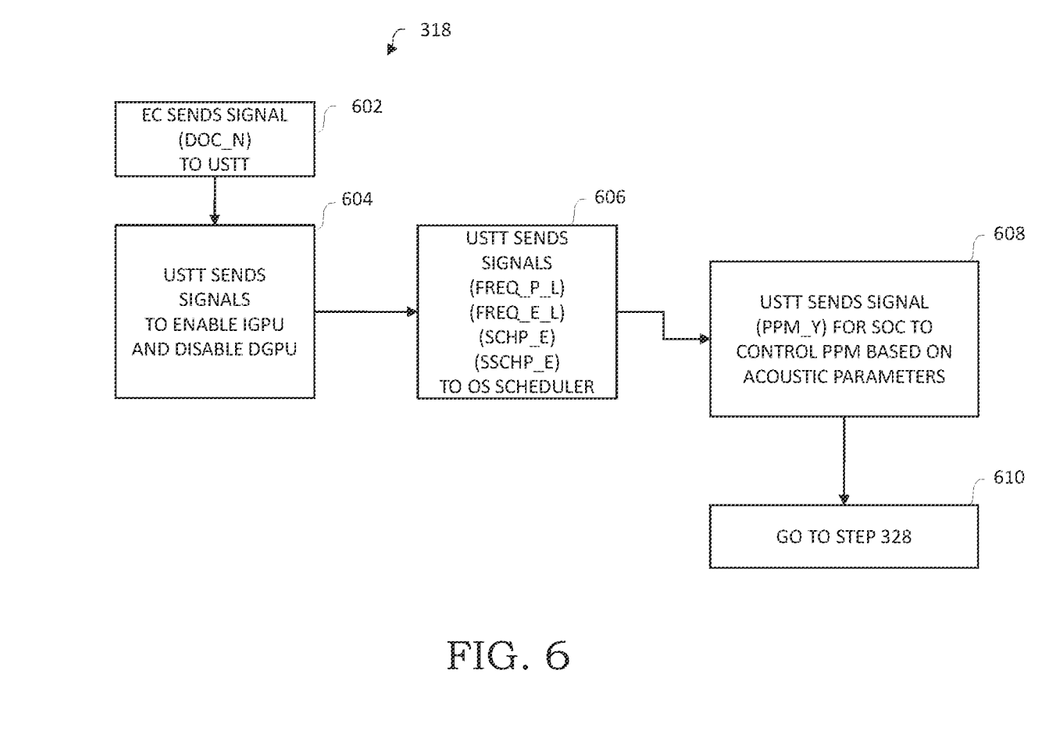

At step 318, in response to EC 10 determining handheld device 100 is not connected to power supply 22, a user is not holding handheld device 100 and handheld device is coupled to external display 52, embodiments may be configured to operate in Quiet Mode, discussed in greater detail with respect to FIG. 6.

At step 320, in response to EC 10 determining handheld device 100 is not connected to power supply 22 but a user is holding handheld device 100, embodiments may determine if Peak Mode button 54 is activated.

At step 322, in response to EC 10 determining handheld device 100 is not connected to power supply 22, a user is holding handheld device 100 and Peak Mode button 54 is activated, embodiments may determine a battery capacity for battery 20.

At step 324, embodiments may determine if the battery capacity of battery 20 is greater than a minimum charge threshold.

If EC 10 determines the battery capacity of battery 20 is less than the minimum charge threshold, embodiments may be configured to operate in Quiet Mode at step 318 and as discussed in greater detail with respect to FIG. 6.

Figure 7:
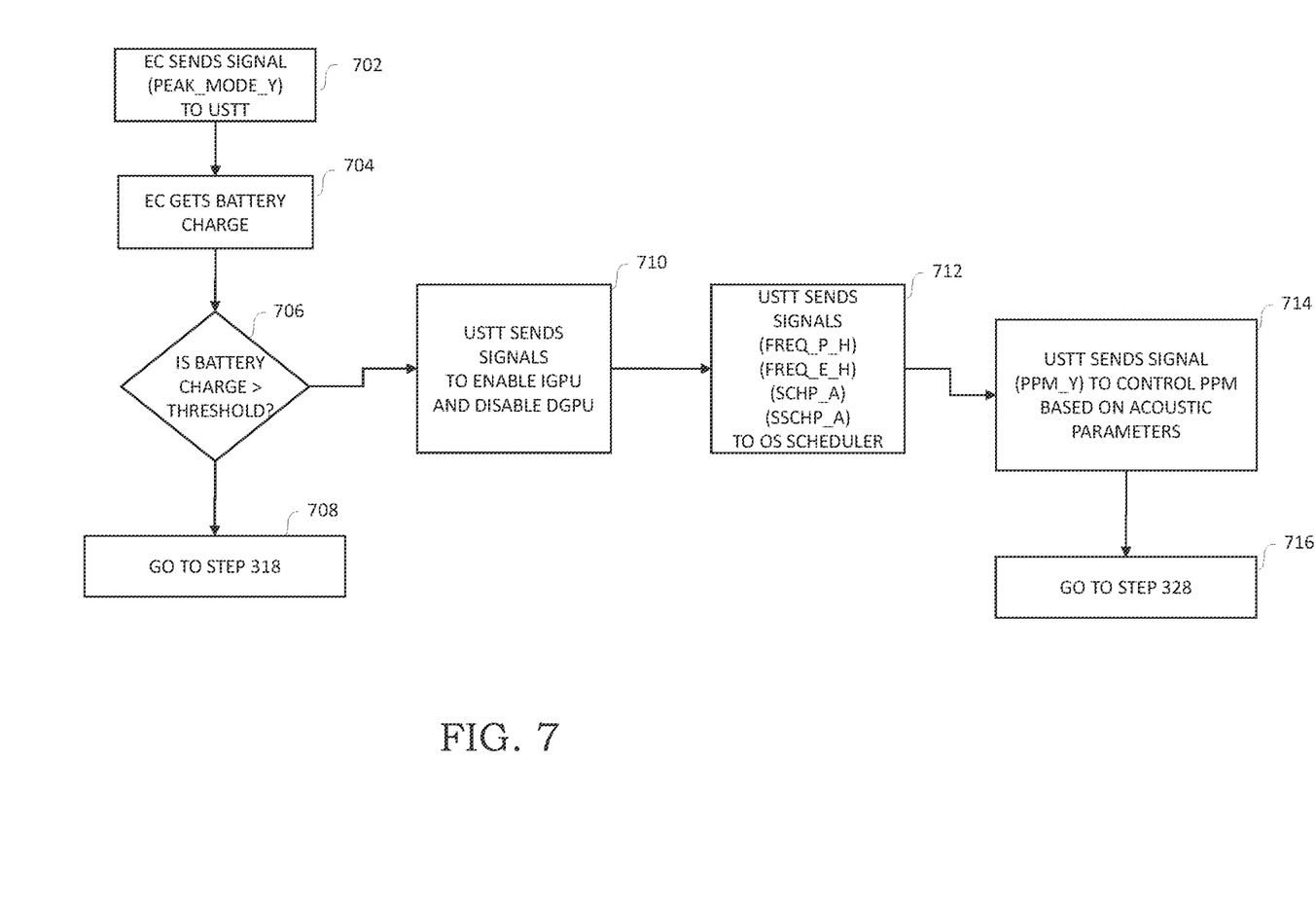

At step 326, in response to EC 10 determining the battery capacity of battery 20 is greater than the minimum charge threshold, embodiments may be configured to operate in Peak Mode, discussed in greater detail with respect to FIG. 7.

At step 328, embodiments may determine if the user has stopped playing or if the session should otherwise be exited.

In response to determining embodiments should not exit a session, embodiments may repeat any of steps 306-328.

In response to determining embodiments should exit a session, at step 330 the provided service 12 may be unloaded and handheld device 100 may be powered down.

Ultra Performance Mode

FIG. 4 depicts a flow diagram referring to step 308 of FIG. 3.

FIG. 4 depicts a flow diagram for configuring embodiments to operate in Ultra Performance Mode. At step 310, EC 10 may determine whether handheld device 100 is coupled ("docked") to dock 14. In some embodiments, EC 10 comprises dock sensor 16 and software to determine when handheld device 100 is coupled to dock 14.

In step 402, EC 10 may communicate a docking signal (e.g., DOC_Y) to software USTT 24 to configure handheld device 100 in Ultra Performance Mode.

At step 404, USTT 24 may communicate signals to enable processing of regular and short threads on cores 40 in both IGPU 34 and DGPU 48.

At step 406, USTT 24 may communicate a set of signals to enable processing of all threads on all cores 40, wherein processor 38 runs threads on all cores 40 at a performance level associated with the Ultra Performance Mode. For example, USTT 24 may communicate a first signal (e.g., FRQ_P_H) indicating a set of P-cores 40-1 should run at a frequency for high performance, a second signal (e.g., FRQ_E_H) indicating a set of E-cores 40-2 should run at a frequency for high performance, a third signal (e.g., SCHP_A) corresponding to a Scheduling policy indicating regular thread scheduling can occur on all cores 40 and a fourth signal (e.g., SSCHP_A) corresponding to a Short Scheduling policy indicating scheduling of short threads can occur on all cores 40. In some embodiments, processor 38 may run at a maximum frequency (e.g., 100%). In some embodiments, the maximum frequency may be a default frequency.

At step 408, USTT 24 may communicate a signal (e.g. PPM_Y) to thermal management service 44 to control power plan management service (PPM) 46 based on best performance parameters. Thermal management service 44 may send a signal (e.g., SOC_D) to PPM 46 to turn off EPO.

At step 410, embodiments may proceed to step 328.

Optimized Mode

FIG. 5 depicts a flow diagram corresponding to step 312 of FIG. 3.

At step 502, EC 10 may communicate a docking signal (e.g., DOC_N) to USTT 24 to configure handheld device 100 in Optimized Mode.

At step 504, USTT 24 may communicate signals to enable processing of regular and short threads on IGPU 34 and disable processing of threads on cores 40-3 and 40-4 in DGPU 48.

At step 506, USTT 24 may communicate a first signal (e.g., FRQ_P_L) indicating a set of P-cores 40-1 should run at a lower frequency for lower power consumption, a second signal (e.g., FRQ_E_H) indicating a set of E-cores 40-2 should run at a frequency for high performance, a third signal (e.g., SCHP_E) for a Scheduling policy indicating regular thread scheduling can occur on E-cores 40-1 and a fourth signal (e.g., SSCHP_P) for a Short Scheduling policy indicating scheduling of short threads can occur on P-cores 40-2. In some embodiments, processor 38 may run at a frequency (e.g., 75% maximum frequency) for lower power consumption.

At step 508, USTT 24 may communicate a signal (e.g. PPM_Y) to thermal management service 44 to control power plan management service (PPM) 46 based on a set of thermal performance parameters. Thermal management service 44 may send a signal (e.g., SOC_D) to PPM 46 to turn off EPO.

At step 510, embodiments may proceed to step 328.

Quiet Mode

FIG. 6 depicts a flow diagram corresponding to step 318 of FIG. 3.

At step 602, EC 10 may communicate a docking signal (e.g., DOC_N) to USTT 24 to configure handheld device 100 in Quiet Mode.

At step 604, USTT 24 may communicate signals to enable processing of regular and short threads on IGPU 34 and disable processing of threads on cores 40-3 and 40-4 in DGPU 48.

At step 606, USTT 24 may communicate a first signal (e.g., FRQ_P_L) indicating a set of P-cores 40-1 should run at a lower frequency, a second signal (e.g., FRQ_E_L) indicating a set of E-cores 40-2 should run at a lower frequency, a third signal (e.g., SCHP_E) for a Scheduling policy indicating regular thread scheduling can occur on E-cores 40-1 and a fourth signal (e.g., SSCHP_P) for a Short Scheduling policy indicating scheduling of short threads should also occur on E-cores 40-2. In some embodiments, processor 38 may run at a frequency that is approximately 50% of a maximum frequency.

At step 608, USTT 24 may communicate a signal (e.g. PPM_Y) to thermal management service 44 to control power plan management service (PPM) 46 based on a set of acoustic performance parameters. Thermal management service 44 may send a signal (e.g., SOC_D) to PPM 46 to turn off EPO. Acoustic parameters may include noise levels associated with fan 26. In some embodiments, acoustic parameters may include speeds of processor 38 or other components to ensure fan 26 can operate below a threshold fan speed.

At step 610, embodiments may proceed to step 328.

Peak Mode

FIG. 7 depicts a flow diagram corresponding to step 326 of FIG. 3.

At step 702, EC 10 may communicate a signal (e.g., PEAK_MODE_Y) to USTT 24 to configure handheld device 100 in Peak Mode.

At step 704, EC 10 may communicate with battery sensor 18 to get a battery charge for battery 20.

At step 706, provided service 12 may determine if the battery charge is greater than the minimum charge threshold.

At step 708, if the battery charge is at or below the minimum charge threshold, embodiments may determine handheld device 100 cannot operate in Peak Mode and go to step 318.

At step 710, if the battery charge is greater than the minimum charge threshold, USTT 24 may communicate signals to enable processing of threads on IGPU 34 and disable DGPU 48.

At step 712, USTT 24 may communicate a first signal (e.g., FRQ_P_H) indicating a set of P-cores 40-1 can run at a higher frequency, a second signal (e.g., FRQ_E_H) indicating a set of E-cores 40-2 can run at a higher frequency, a third signal (e.g., SCHP_A) for a Scheduling policy indicating regular thread scheduling can occur on all cores 40 and a fourth signal (e.g., SSCHP_A) for a Short Scheduling policy indicating scheduling of short threads can occur on all cores 40. In some embodiments, processor 38 may run at a frequency (e.g., 75%) associated with the Optimized Mode.

At step 714, USTT 24 may communicate a signal (e.g. PPM_Y) to thermal management service 44 to control power plan management service (PPM) 46 based on a set of performance parameters. Thermal management service 44 may send a signal (e.g., SOC_D) to PPM 46 to turn off EPO. Acoustic parameters may include noise levels associated with fan 26. In some embodiments, acoustic parameters may include speeds of processor 38 or other components to ensure fan 26 can operate below a threshold fan speed.

At step 716, embodiments may proceed to step 328.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method of configuring operation of a handheld device, the method comprising:
    an embedded controller (EC) determining one of: the handheld device is coupled to a dock, is coupled to a power supply supplying constant power, or is receiving battery power from a battery;
    a provided service stored in a memory medium in the handheld device determining a state of the handheld device by:
        communicating with the EC to determine if the handheld device is docked, if the handheld device is operating on the constant power from the power supply or if the handheld device is operating on the battery power from the battery; and
        determining if the handheld device is moving or is stationary; and
    the provided service configuring the handheld device in one of an Ultra Performance Mode, an Optimized Mode, a Quiet Mode or a Peak Mode in response to determining the state of the handheld device,
    wherein configuring the handheld device to operate in the Ultra Performance Mode comprises:
        in response to receiving a signal from the EC indicating the handheld device is coupled to the dock, the provided service performs:
            communicating a signal to enable thread processing on an integrated graphics processing unit (IGPU) in a processor;
            communicating a signal to enable thread processing on a discrete graphics processing unit (DGPU);
            communicating a signal to an operating system (OS) scheduler to schedule a set of regular threads on the IGPU and the DGPU; and
            communicating a signal to the OS scheduler to schedule a set of short threads on the IGPU and the DGPU.

2. The method of claim 1, wherein configuring the handheld device to operate in the Optimized Mode comprises:

in response to receiving a signal from the EC indicating the handheld device is receiving constant power from a constant power supply, the provided service performs:
communicating a signal to enable thread processing on an integrated graphics processing unit (IGPU);
communicating a signal to disable thread processing on a discrete graphics processing unit (DGPU);
communicating a signal to an operating system (OS) scheduler to schedule a set of regular threads on a set of efficiency cores in the IGPU; and
communicating a signal to the OS scheduler to schedule a set of short threads on a set of performance cores in the IGPU.

3. The method of claim 2, wherein the provided service further performs:
determining one or more of the handheld device is not moving and the handheld device is coupled to an external display; and
communicating a signal to a thermal management service to operate a fan based on a thermal parameter.

4. The method of claim 1, wherein configuring the handheld device to operate in the Quiet Mode comprises:
in response to receiving a signal from the EC indicating the handheld device is receiving battery power from the battery, the provided service performs:
determining the handheld device is moving;
communicating a signal to enable thread processing on an integrated graphics processing unit (IGPU);
communicating a signal to disable thread processing on a discrete graphics processing unit (DGPU);
communicating a signal to an operating system (OS) scheduler to schedule a set of regular threads on a set of efficiency cores in the IGPU; and
communicating a signal to the OS scheduler to schedule a set of short threads on the set of efficiency cores in the IGPU.

5. The method of claim 4, wherein the provided service further performs:
determining one or more of the handheld device is not moving and the handheld device is coupled to an external display; and
communicating a signal to a thermal management service to operate a fan based on an acoustic parameter.

6. The method of claim 1, wherein configuring the handheld device to operate in the Peak Mode comprises:
in response to receiving a signal from the EC indicating a Peak Mode button is activated, the provided service performs:
determining a battery charge of the battery; and
in response to determining the battery charge of the battery is greater than the minimum charge threshold:
communicating a signal to a processor to operate at a frequency less than a maximum frequency;
communicating a signal to enable thread processing on an integrated graphics processing unit (IGPU);
communicating a signal to disable thread processing on a discrete graphics processing unit (DGPU);
communicating a signal to an operating system (OS) scheduler to schedule a set of regular threads on a set of efficiency cores in the IGPU; and
communicating a signal to the OS scheduler to schedule a set of short threads on the set of efficiency cores in the IGPU.

7. The method of claim 6, configuring the handheld device to operate in the Peak Mode comprises:
in response to determining the battery charge of the battery is less than the minimum charge threshold:
communicating a signal to disable thread processing on the DGPU; and
communicating a signal to the OS scheduler to schedule the set of short threads on the set of efficiency cores in the IGPU.

8. The method of claim 1, wherein the provided service further performs:
communicating a signal to a processor such that a set of performance cores operate at one of a first performance level associated with the Ultra Performance Mode, a second performance level associated with the Optimized Mode, a third performance level associated with the Quiet Mode or a fourth performance level associated with the Peak Mode; and
communicating a signal to the processor such that a set of efficiency cores operate at one of the first performance level, the second performance level, the third performance level or the fourth performance level.

9. The method of claim 8, wherein;
the first performance level is approximately 100% of a maximum performance level,
the second performance level is between 65-85% of the maximum performance level,
the third performance level is between 40-60% of the maximum performance level, and
the fourth performance level is between 65-85% of the maximum performance level.

10. A system for configuring a handheld device based on a state of the handheld device, the system comprising:
a handheld device comprising:
an embedded controller (EC);
a battery;
a Peak Mode button; and
a memory medium storing:
a provided service;
user selectable thermal tables (USTT);
a power plan management (PPM) software; and
a thermal management service (TMS) software;
a dock configured to receive the handheld device; and
a power supply configured to supply constant power to the handheld device when coupled to the handheld device,
wherein the EC is configured to:
communicate with a dock sensor, the power supply, a battery sensor, and the Peak Mode button; and
communicate a signal to the provided service;
wherein the provided service is configured to:
determine, based on the signal, one of the handheld device being docked, coupled to the power supply or receiving power from the battery;
determine whether the handheld device is coupled to an external display;
determine whether the handheld device is stationary;
determine whether the Peak Mode button is activated; and
configure the handheld device in one of an Ultra Performance Mode, an Optimized Mode, a Quiet Mode or a Peak Mode based on one or more of whether the handheld device is docked, coupled to the power supply, receiving power from the battery, coupled to the external display, is stationary and whether the Peak Mode button is activated.

11. The system of claim 10, wherein:
in response to determining the handheld device is docked, the provided service is configured to:
- communicate a signal to enable thread processing on an integrated graphics processing unit (IGPU);
- communicate a signal to enable thread processing on a discrete graphics processing unit (DGPU);
- communicate a signal to an operating system (OS) scheduler to schedule a set of regular threads on the IGPU and the DGPU; and
- communicate a signal to the OS scheduler to schedule a set of short threads on the IGPU and the DGPU.

12. The system of claim 10, wherein in response to determining the handheld device is not docked and connected to constant power, the provided service is configured to:
- communicate a signal to enable thread processing on an integrated graphics processing unit (IGPU);
- communicate a signal to disable thread processing on a discrete graphics processing unit (DGPU);
- communicate a signal to an operating system (OS) scheduler to schedule a set of regular threads on a set of efficiency cores in the IGPU; and
- communicate a signal to the OS scheduler to schedule a set of short threads on a set of performance cores in the IGPU.

13. The system of claim 12, wherein the provided service is configured to:
- determine one or more of the handheld device is not moving and the handheld device is coupled to an external display; and
- communicate a signal to the TMS to operate a fan based on a thermal parameter.

14. The system of claim 10, wherein in response to determining the handheld device is not docked and is receiving power from the battery, the provided service is configured to:
- determine whether the handheld device is moving;
- communicate a signal to enable thread processing on an integrated graphics processing unit (IGPU);
- communicate a signal to disable thread processing on a discrete graphics processing unit (DGPU);
- communicate a signal to an operating system (OS) scheduler to schedule a set of regular threads on a set of efficiency cores in the IGPU; and
- communicate a signal to the OS scheduler to schedule a set of short threads on the set of efficiency cores in the IGPU.

15. The system of claim 14, wherein the provided service is configured to:
- determine one or more of the handheld device is not moving and the handheld device is coupled to an external display; and
- communicate a signal to a thermal management service to operate a fan based on an acoustic parameter.

16. The system of claim 14, wherein the provided service is configured to:
- determine one or more of the handheld device is not moving and the handheld device is coupled to an external display; and
- communicate a signal to a thermal management service to operate a fan based on a thermal parameter.

17. The system of claim 10, wherein in response to determining the Peak Mode button is activated, the provided service is configured to:
- determine a battery charge of the battery; and
- in response to determining the battery charge of the battery is greater than a minimum charge threshold:
  - communicate a signal to enable thread processing on an integrated graphics processing unit (IGPU);
  - communicate a signal to enable thread processing on a discrete graphics processing unit (DGPU);
  - communicate a signal to an operating system (OS) scheduler to schedule a set of regular threads on a set of performance cores and a set of efficiency cores in the IGPU and a set of cores in the DGPU; and
  - communicate a signal to the OS scheduler to schedule a set of short threads on the set of performance cores and the set of efficiency cores in the IGPU and the set of cores in the DGPU.

18. The system of claim 10, wherein in response to determining the Peak Mode button is activated, the provided service is configured to:
- determine a battery charge of the battery; and
- in response to determining the battery charge of the battery is less than the minimum charge threshold:
  - communicate a signal to enable thread processing on an integrated graphics processing unit (IGPU);
  - communicate a signal to disable thread processing on a discrete graphics processing unit (DGPU);
  - communicate a signal to an operating system (OS) scheduler to schedule a set of regular threads on a set of efficiency cores in the IGPU; and
  - communicate a signal to the OS scheduler to schedule a set of short threads on the set of efficiency cores in the IGPU.

19. The system of claim 10, wherein the provided service is configured to:
- communicate a signal to the processor such that a set of performance cores operate at one of a first performance level associated with the Ultra Performance Mode, a second performance level associated with the Optimized Mode, a third performance level associated with the Quiet Mode or a fourth performance level associated with the Peak Mode; and
- communicate a signal to the processor such that a set of efficiency cores operate at one of the first performance level, the second performance level, the third performance level or the fourth performance level, wherein:
  - the first performance level is approximately 100% of a maximum performance level,
  - the second performance level is between 65-85% of the maximum performance level,
  - the third performance level is between 40-60% of the maximum performance level, and
  - the fourth performance level is between 65-85% of the maximum performance level.

* * * * *